US010786724B1

(12) United States Patent
Powers et al.

(10) Patent No.: US 10,786,724 B1
(45) Date of Patent: Sep. 29, 2020

(54) BASKETBALL GOAL BRACKET

(71) Applicant: Litania Sports Group, Inc., Champaign, IL (US)

(72) Inventors: Erin L. Powers, Champaign, IL (US); Gregory W. Luebbering, Heyworth, IL (US); Jacob L. Whittaker, West Palm Harbor, FL (US)

(73) Assignee: Litania Sports Group, Inc., Champaign, IL (US)

( * ) Notice: Subject to any disclaimer, the term of this patent is extended or adjusted under 35 U.S.C. 154(b) by 220 days.

(21) Appl. No.: 15/696,232

(22) Filed: Sep. 6, 2017

(51) Int. Cl.
*A63B 71/00* (2006.01)
*A63B 63/08* (2006.01)
*F16M 13/02* (2006.01)

(52) U.S. Cl.
CPC ........ *A63B 71/0054* (2013.01); *A63B 63/083* (2013.01); *F16M 13/02* (2013.01); *A63B 2209/00* (2013.01); *F16M 2200/025* (2013.01)

(58) Field of Classification Search
CPC . A63B 63/083; A63B 71/023; A63B 71/0054; A63B 69/0071; A63B 2209/00; F16M 13/02; F16M 2200/025; F16M 11/40; Y10T 24/44017; Y10T 292/20; F16B 5/0685; F16B 7/0473; F16B 1/00
See application file for complete search history.

(56) References Cited

U.S. PATENT DOCUMENTS

| | | | | | |
|---|---|---|---|---|---|
| 1,450,687 | A | * | 4/1923 | Kunin | A47J 36/10 24/486 |
| 1,527,346 | A | * | 2/1925 | Brady | H01B 17/24 174/154 |
| 1,828,456 | A | * | 10/1931 | Botsford | A47C 7/64 24/67.11 |
| 2,208,358 | A | * | 7/1940 | Chandler | E04H 12/32 24/135 R |
| 2,317,825 | A | * | 4/1943 | Teas, Sr. | F16L 3/04 248/62 |
| 2,630,531 | A | * | 3/1953 | Finneburgh, Jr. | H01Q 11/16 343/801 |
| 2,835,002 | A | * | 5/1958 | Majewski | E04G 7/18 403/398 |
| 3,035,860 | A | * | 5/1962 | Bradner | B65D 55/04 220/324 |
| 3,227,406 | A | * | 1/1966 | Shelton | F16L 3/1091 248/74.4 |
| 3,524,627 | A | * | 8/1970 | Boyanton | E04H 17/1413 248/230.5 |
| 3,583,663 | A | * | 6/1971 | Snow, Jr. | F16B 15/0015 248/71 |
| 4,209,155 | A | * | 6/1980 | Florian | F01N 13/1805 248/62 |
| 4,790,574 | A | * | 12/1988 | Wagner | F16L 21/06 285/419 |

(Continued)

*Primary Examiner* — Melba Bumgarner
*Assistant Examiner* — Amir A Klayman
(74) *Attorney, Agent, or Firm* — Philip L. Bateman

(57) ABSTRACT

A basketball goal assembly includes a suspended vertical mast, a backstop, a rim, at least one mounting bracket, at least two U-bolts straddling the mast for attaching the goal to the mast, and a safety bracket. The safety bracket straddles a U-bolt. The safety bracket reduces the possibility of the goal falling off the mast and also provides a visual indicator when the goal has begun to slip downward.

12 Claims, 5 Drawing Sheets

(56) References Cited

U.S. PATENT DOCUMENTS

| | | | | |
|---|---|---|---|---|
| 4,793,612 | A | * | 12/1988 | Hammond .......... A63B 69/0079 |
| | | | | 473/429 |
| 4,993,670 | A | * | 2/1991 | Tesar .................... F16L 3/1091 |
| | | | | 248/68.1 |
| 5,755,630 | A | * | 5/1998 | Malwitz ............. A63B 69/0079 |
| | | | | 473/429 |
| D438,093 | S | * | 2/2001 | Mandujano .................... D8/396 |
| 8,220,781 | B2 | * | 7/2012 | Gray .................. E04H 17/1421 |
| | | | | 256/65.02 |
| 9,132,796 | B1 | * | 9/2015 | Matthews ................ B60R 19/54 |
| 2012/0138760 | A1 | * | 6/2012 | Gephart .................... F16B 2/12 |
| | | | | 248/226.11 |
| 2012/0267494 | A1 | * | 10/2012 | Manahan ................ F42B 39/00 |
| | | | | 248/226.11 |

* cited by examiner 181
182
183
184
185

US 10,786,724 B1

BASKETBALL GOAL BRACKET

FIELD OF THE INVENTION

This invention relates to games. More particularly, this invention relates to the game of basketball. Still more particularly, this invention relates to basketball goal assemblies.

BACKGROUND OF THE INVENTION

The game of basketball was invented by Dr. James Naismith in 1891 to provide off-season exercise for baseball and football players. Dr. Naismith climbed a ladder and hammered a bottomless peach basket to a balcony as the first basketball goal. The game of basketball rapidly gained popularity and is now one of the most widely played games in the United States and the rest of the world.

The bottomless peach basket nailed to a balcony has long since been replaced by a goal consisting of a backstop (sometimes known as a backboard) and a rim. The goal typically also includes a net attached to the rim that provides a visual aid in shooting the basketball and slows the basketball as it passes through the rim. The goal is mounted to a pole or a suspended vertical mast so the top of the rim is the desired height above the floor of the basketball court. While the goal is sometimes mounted directly to the pole or mast, one or more mounting brackets are typically interposed between them. The standard height of the rim is ten feet, but children sometimes play on goals of reduced height. The area directly below the goal is preferably unobstructed so players do not run into a wall or pole during play.

When basketball goals are mounted to a suspended vertical mast, the goal is often attached to the vertical mast with two or more U-bolts. Attachment of a basketball goal to a vertical mast is disclosed in Schroeder, U.S. Pat. No. 6,511,391, Jan. 28, 2003, hereby incorporated by reference. A typical basketball goal mounted on a mast is illustrated in FIG. 1. The assembly 10 consists of a backstop 20, a rim 30, a net 40, an upper mounting bracket 50, a lower mounting bracket 55, a mast 60, an upper mounting U-bolt 70, and a lower mounting U-bolt 75.

One danger of attaching a basketball goal to a suspended vertical mast is that the entire basketball goal can fall to the ground without warning if the U-bolts fail to securely hold the goal on the mast. The failure of the mounting U-bolts is most commonly caused by a loosening of the nuts that are used to fasten them to the mounting brackets. However, the U-bolts can fail for other reasons as well. A basketball goal weighs several hundred pounds and can cause death or serious injury if anyone is under the goal if it falls.

Accordingly, there is a demand for a basketball goal assembly comprising a backstop, a rim, and mounting brackets mounted on a vertical mast that is less likely to fall in the event of failure of the mounting U-bolts and that provides a visual warning if the mounting U-bolts begin to fail and when a fall is likely to occur.

SUMMARY OF THE INVENTION

The general object of this invention is to provide an improved basketball goal assembly. A more particular object is to provide a basketball goal mounted on a vertical mast that is less likely to fall in the event of failure of the mounting U-bolts and that provides a visual warning if the mounting U-bolts begin to fail and when a fall is likely to occur.

We have invented an improved basketball goal assembly. The assembly comprises: (a) a vertical cylindrical mast suspended from a support; (b) a backstop having a front and a back; (c) a rim attached to the front of the backstop; (d) at least one mounting bracket attached to the back of the backstop; (e) at least two horizontal U-bolts straddling the mast and attached to a mounting bracket; and (f) an elongated and integral safety bracket attached to the mast and vertically straddling one of the U-bolts, the safety bracket sequentially comprising: (i) an upper base section with a hole for attachment to the mast; (ii) an upper riser section; (iii) a wave section having an upper crest extending away from the mast, a trough extending toward the mast, and a lower crest extending away from the mast; (iv) a lower riser section; and (v) a lower base section with a hole for attachment to the mast; the straddled U-bolt fitting tightly under the upper crest of the wave section and abutting the upper riser section and the trough of the wave section.

The basketball goal assembly of this invention has a goal that is less likely to fall in the event of failure of the mounting U-bolts and that provides a visual warning if the mounting U-bolts begin to fail and when a fall is likely to occur. Both advantages are provided by the safety bracket that straddles one of the U-bolts and is attached to the mast.

DETAILED DESCRIPTION OF THE INVENTION

Figure 1:
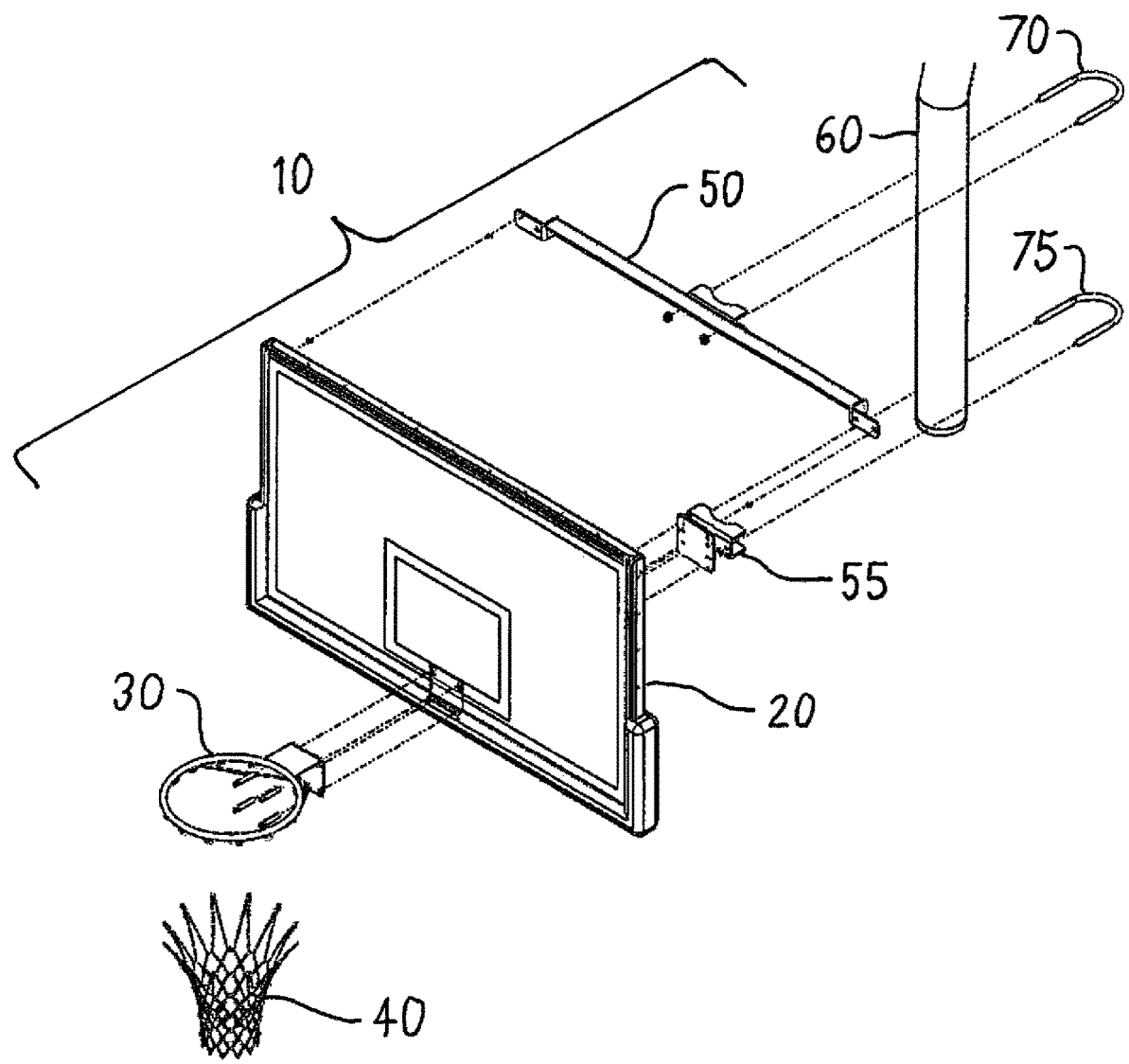
FIG. 1 is an exploded perspective view of a prior art basketball goal assembly.
Figure 2:
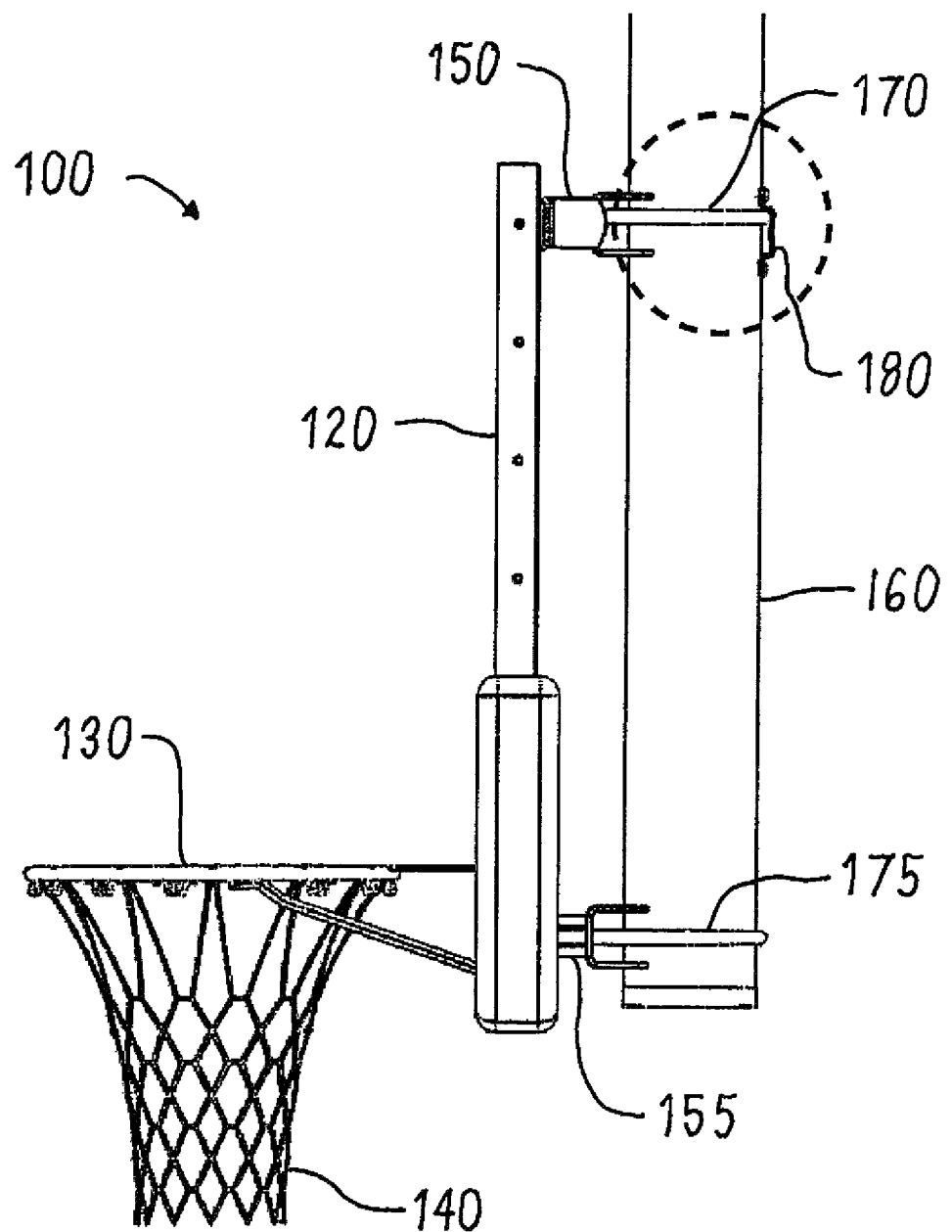
FIG. 2 is a side elevation view of an embodiment of the basketball goal assembly of this invention.

This invention is best understood by reference to the drawings. Referring to FIG. 2, a preferred embodiment of the basketball goal assembly 100 of this invention has a backstop 120, a rim 130, a net 140, an upper mounting bracket 150, a lower mounting bracket 155, a vertical mast 160, an upper mounting U-bolt 170, a lower mounting U-bolt 175, and a safety bracket 180. The rim is attached to the front of the backstop with conventional fasteners. The upper mounting bracket and the lower mounting bracket are attached to the back of the backstop with conventional fasteners. All the components of the assembly except for the safety bracket are conventional and are well known in the art.

Figure 3:
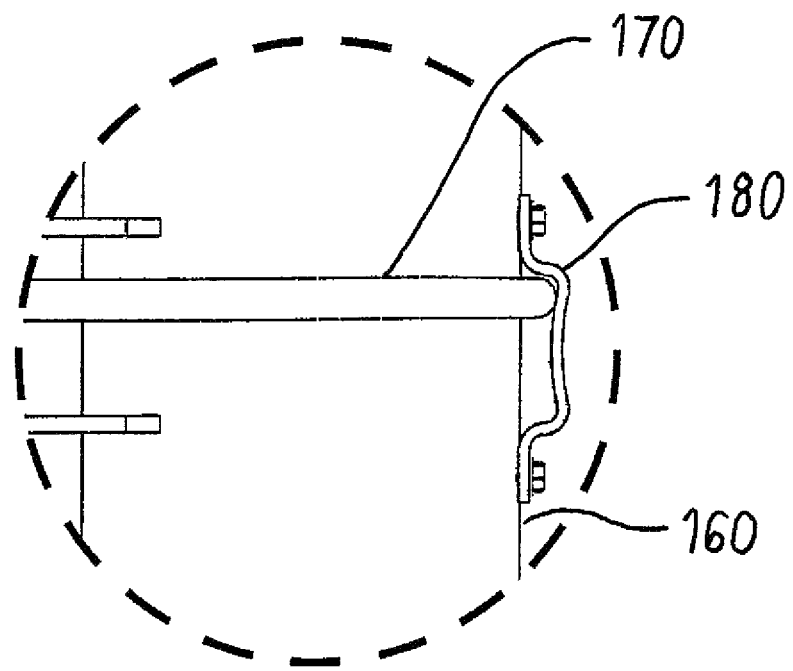
FIG. 3 is a detailed view of a portion of FIG. 2 with the upper U-bolt in a first position.
Figure 4:
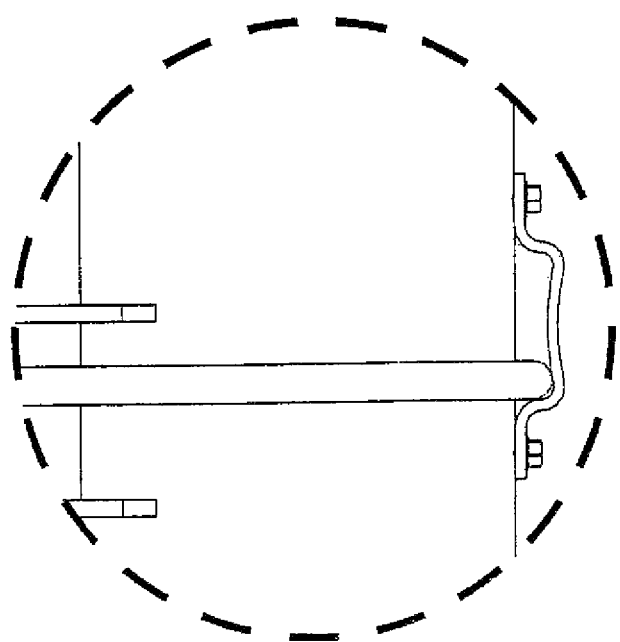
FIG. 4 is a detailed view of the portion of FIG. 2 with the upper U-bolt in a second position.
Figure 5:
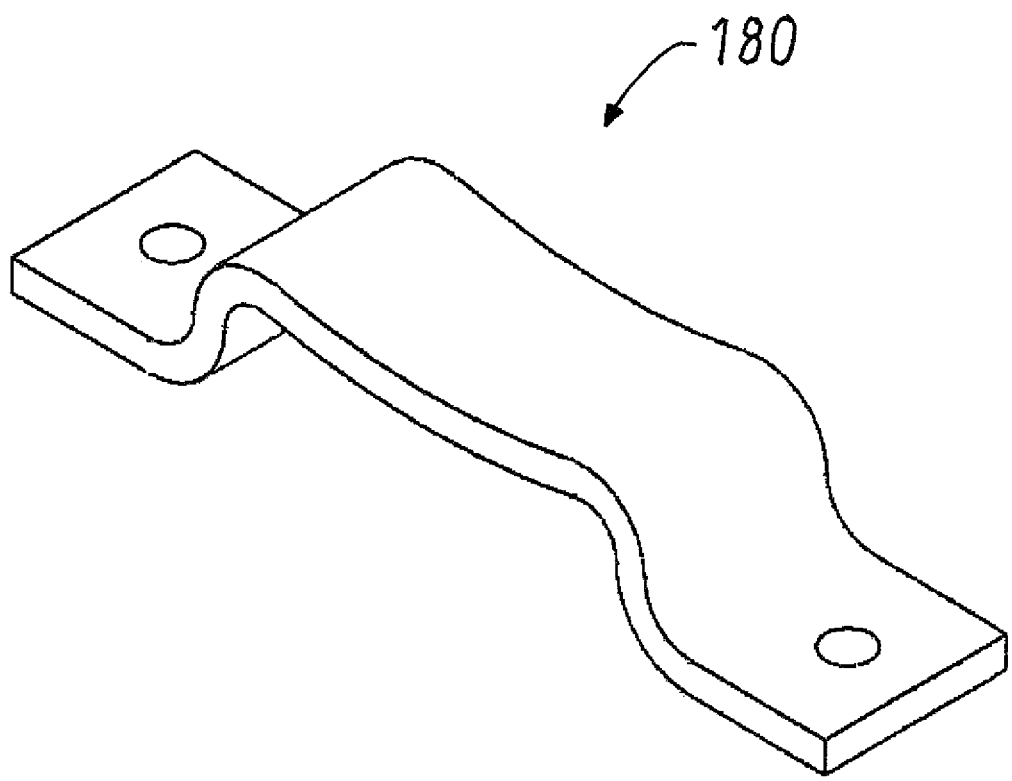
FIG. 5 is perspective view of the safety bracket thereof.
Figure 7:
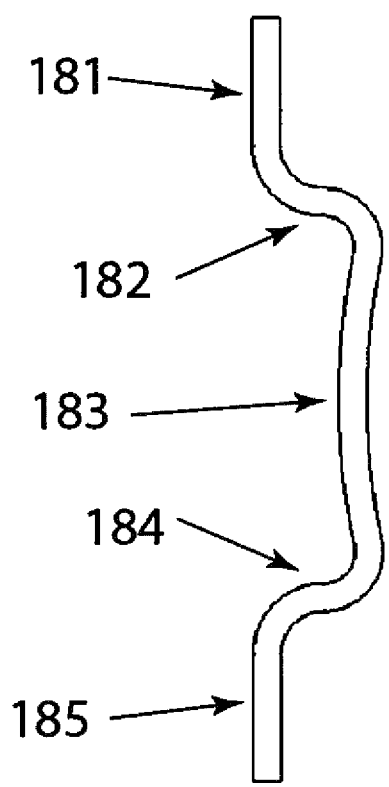
FIG. 7 is a side elevation view thereof.
Figure 6:
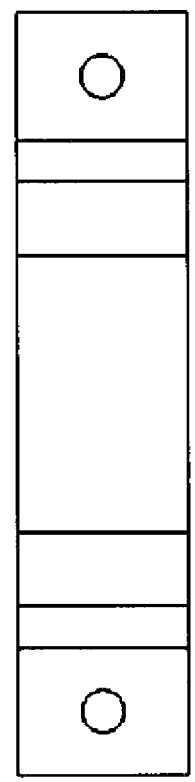
FIG. 6 is a top view thereof.

The safety bracket is shown as part of the assembly in detail in FIGS. 3 and 4. The portion of the detail is shown in a circular broken line in FIG. 2. The safety bracket is shown separately in FIGS. 5 to 7. The safety bracket is an elongated and integral piece of durable, resilient, and strong material such as metal. The preferred metal is steel. The safety bracket is securely attached to the mast with two or more fasteners.

The integral safety bracket is bent or molded into different sections. The sections can best be described sequentially from top to bottom when it is in the vertical installed position as oriented in FIGS. 6 and 7. The first section is an upper base 181. The upper base has a hole in it for attachment to the mast. The second section is an upper riser 182 that rises from the upper base and extends outwardly from the mast. The third section is a wave 183 that bends from the upper riser and has an upper crest, a trough, and a lower crest. The fourth section is a lower riser 184 that extends inwardly from the lower crest. The fifth section is a lower base 185. The lower base has a hole in it for attachment to the mast.

The size of the safety bracket is determined by the diameter of the U-bolts used to mount the goal to the mast. As discussed below, the safety bracket and the mast form an upper pocket into which one of the U-bolts fits. The safety bracket and the mast also form a lower pocket into which the U-bolt enters in the event the goal begins to slip downwardly off the mast. The safety bracket generally has a length of about four to five inches, a width of about three-fourths to one and one-half inches, and a height of about one-half to one inch.

The operation of the basketball goal assembly can now be considered. When the basketball goal is mounted on the mast in the desired position, the safety bracket is fastened in a straddling position over one of the U-bolts with the U-bolt fitting tightly in the upper pocket of the safety bracket as shown in FIG. 3. The upper pocket is formed by the upper riser, the upper crest, and the trough of the safety bracket in combination with the mast. The trough under the U-bolt and the rest of the upper pocket help to hold the U-bolt in the upper pocket.

If over time the nuts holding the U-bolts loosen and the goal begins to slide downwardly for this reason (or if the goal slides downwardly for any other reason), the U-bolt straddled by the safety bracket reaches a position where it is in the lower pocket of the safety bracket as shown in FIG. 4. The lowered position is clearly visible and is an indicator that the U-bolts have failed, the goal has slipped downward, and the goal is in danger of falling. The safety bracket also provides an additional level of attachment that reduces the possibility of the goal falling completely off the mast.

We claim:

1. A basketball goal assembly comprising:
   (a) a vertical cylindrical mast suspended from a support;
   (b) a backstop having a front and a back;
   (c) a rim attached to the front of the backstop;
   (d) at least one mounting bracket attached to the back of the backstop;
   (e) at least two horizontal U-bolts with open ends straddling the mast and attached to a mounting bracket; and
   (f) an elongated and integral safety bracket having a longitudinal axis, the safety bracket attached to the mast with the longitudinal axis vertical and transversely straddling one of the U-bolts, the safety bracket sequentially comprising: (i) an upper base section with a hole for attachment to the mast; (ii) an upper riser section; (iii) a wave section having an upper crest extending away from the mast, a trough extending toward the mast, and a lower crest extending away from the mast; (iv) a lower riser section; and (v) a lower base section with a hole for attachment to the mast; the straddled U-bolt fitting tightly under the upper crest of the wave section with its open ends directed toward the mast and abutting the upper riser section and the trough of the wave section.

2. The basketball goal assembly of claim 1 wherein the basketball goal assembly comprises an upper U-bolt and a lower U-bolt and wherein the safety bracket straddles the upper U-bolt.

3. The basketball goal assembly of claim 2 wherein the safety bracket is a bent piece of metal.

4. The basketball goal assembly of claim 3 wherein the safety bracket has a length of about four to five inches.

5. The basketball goal assembly of claim 4 wherein the safety bracket has a height of about one-half to one inch.

6. The basketball goal assembly of claim 1 wherein the upper riser section and the lower riser section of the safety bracket are solid without any apertures.

7. A basketball goal assembly comprising:
   (a) a vertical cylindrical mast suspended from a support;
   (b) a backstop having a front and a back;
   (c) a rim attached to the front of the backstop;
   (d) at least one mounting bracket attached to the back of the backstop;
   (e) at least two horizontal U-bolts with open ends straddling the mast and attached to a mounting bracket; and
   (f) an elongated and integral safety bracket having a longitudinal axis, the safety bracket attached to the mast with the longitudinal axis vertical and transversely straddling one of the U-bolts with its open ends directed toward the mast, the safety bracket forming an upper pocket with the mast into which the straddled U-bolt fits and also forming a lower pocket with the mast into which the straddled U-bolt enters in the event the backstop and U-bolts slip downwardly along the mast.

8. The basketball goal assembly of claim 7 wherein the basketball goal assembly comprises an upper U-bolt and a lower U-bolt and wherein the safety bracket straddles the upper U-bolt.

9. The basketball goal assembly of claim 8 wherein the safety bracket is a bent piece of metal.

10. The basketball goal assembly of claim 9 wherein the safety bracket has a length of about four to five inches.

11. The basketball goal assembly of claim 10 wherein the safety bracket has a height of about one-half to one inch.

12. The basketball goal assembly of claim 7 wherein the upper riser section and the lower riser section of the safety bracket are solid without any apertures.

\* \* \* \* \*